United States Patent
Payne et al.

(10) Patent No.: US 6,931,456 B2
(45) Date of Patent: Aug. 16, 2005

(54) STANDARD CONFIGURABLE UNIVERSAL SERIAL BUS (USB) DEVICE IDENTIFIER

(75) Inventors: Stephen R. Payne, Cortland, NY (US); Hugh Alan Jonas, Lansing, NY (US)

(73) Assignee: TransAct Technologies Incorporated, Wallingford, CT (US)

(*) Notice: Subject to any disclaimer, the term of this patent is extended or adjusted under 35 U.S.C. 154(b) by 47 days.

(21) Appl. No.: 10/658,862

(22) Filed: Sep. 9, 2003

(65) Prior Publication Data

US 2005/0055471 A1 Mar. 10, 2005

(51) Int. Cl.[7] .................................................. G06F 3/00
(52) U.S. Cl. .............................. 710/9; 710/3; 710/10; 710/16; 710/17; 710/62
(58) Field of Search ....................... 710/2, 8–11, 15–19, 710/62

(56) References Cited

U.S. PATENT DOCUMENTS

| | | | |
|---|---|---|---|
| 6,251,014 B1 | 6/2001 | Stockdale et al. | ............ 463/16 |
| 6,345,319 B2 * | 2/2002 | Lin et al. | ....................... 710/8 |
| 6,370,591 B2 * | 4/2002 | Kaihlaniemi | ................ 719/321 |
| 6,503,147 B1 | 1/2003 | Stockdale et al. | ............ 463/29 |
| 6,567,875 B1 | 5/2003 | Williams et al. | ............ 710/302 |
| 6,654,136 B2 * | 11/2003 | Shimada | ..................... 358/1.15 |
| 6,697,073 B1 * | 2/2004 | Kadota | ........................ 345/501 |
| 6,745,255 B2 * | 6/2004 | Yen et al. | ...................... 710/13 |

FOREIGN PATENT DOCUMENTS

| | | | | |
|---|---|---|---|---|
| EP | 1 434 130 | | 6/2004 | ........... G06F/9/445 |
| EP | 1434130 A2 * | | 6/2004 | ......... G06F/09/445 |

* cited by examiner

Primary Examiner—Jeffrey Gaffin
Assistant Examiner—Alan Chen
(74) Attorney, Agent, or Firm—Lipsitz & McAllister, LLC

(57) ABSTRACT

The present invention provides a USB peripheral device belonging to a model line of identical peripheral devices. The peripheral device includes a USB interface enabling connection of the peripheral device to a USB port of a host device. The peripheral device also includes a memory for storing a USB device identifier. The USB device identifier comprises a standard USB device identifier that is the same for all the peripheral devices of the model line. The standard USB device identifier identifies each peripheral device in the model line to the host device as identical devices, thereby preventing device driver reinstallation and communication port reassignment when swapping one peripheral device for another peripheral device from the same model line. This enables identical peripheral devices to be "hot-swappable" such that they can be interchanged on the host device, even when the host device is powered up and running. Corresponding methods are also provided.

42 Claims, 6 Drawing Sheets

FIG. 1 (CONNECTION OF A SINGLE USB DEVICE TO A HOST DEVICE)

(PRIOR ART)

(CONNECTION OF MULTIPLE USB DEVICES TO A HOST DEVICE)

(PRIOR ART)

(SINGLE USB DEVICE REPLACED BY ANOTHER DEVICE OF THE SAME MODEL)

(PRIOR ART)

STANDARD CONFIGURABLE UNIVERSAL SERIAL BUS (USB) DEVICE IDENTIFIER

BACKGROUND OF THE INVENTION

The present invention relates to the field of computer peripherals. More specifically, the present invention relates to a standard device identifier for a Universal Serial Bus (USB) peripheral device which enables any USB peripheral device in a particular model line to be interchanged with another USB device from the same model line, without reinstallation of the device driver or reconfiguration of the communication port for the replacement USB device by the host device.

The standard practice to implement a USB communication connection on a peripheral device requires that the peripheral device be identified. As shown in FIG. 1, the identification of a prior art USB peripheral device 10 is accomplished by providing a unique USB identifier string 12 (e.g., text data) from the peripheral device (e.g., a printer) 10 to the host device (e.g., a personal computer) 14. As shown in FIG. 1, this unique identifier 12 is typically created by using the serial number 11 of the peripheral device 10 or other information which is unique to that particular peripheral device 10. This "uniqueness" allows the operating system of the host device 14 to uniquely identify each peripheral device that is attached to it via a USB link.

This unique identification allows the operating system of the host device 14 to communicate with more than one USB peripheral device as shown in FIG. 2, even if the peripheral devices are the same (e.g., Scanner model XYZ). FIG. 2 shows two peripheral devices 10 and 20 connected to the host device 14 at communications ports 16 and 17 (COM 3 and COM 4), respectively. Each peripheral device is from the same model line 13 (model XYZ). However, each peripheral device has a unique serial number 11, 21, and therefore a unique USB identifier 12, 22.

This standard implementation has the limitation that, in the event a peripheral device is replaced (e.g., due to failure) with a peripheral device that is identical, the operating system must reinstall the USB drivers. This reinstallation is required because each USB device is uniquely identified by its identification string. As shown in FIG. 3, when a peripheral device (e.g., peripheral device 10 of FIG. 1) is replaced with another peripheral device from the same model line (e.g., peripheral device 20), in addition to the reinstallation of device drivers, the operating system of the host device 14 will select a different name for the communications port that a software application uses to communicate to the replacement device 20. As shown in FIG. 3, when replacement device 20 is attached to the host, it is assigned communication port 17 (COM 4), while the application 18 is still attempting to communicate with USB peripheral device 10 via communication port 16 (COM 3). Therefore, this port reassignment further requires that the user application 18 running on the host device 14 be re-configured to use the new port 17 to continue to function and communicate with the replacement USB peripheral device 20. This problem is especially true with printers since printers typically have printer ports created by the operating system, but it is not limited to printers.

It would be advantageous to enable interchangeability of identical USB peripheral devices from the same model line without the need to reinstall device drivers or reconfigure communication ports on the host device.

The methods and apparatus of the present invention provide the foregoing and other advantages.

SUMMARY OF THE INVENTION

The present invention relates to a standard device identifier for a Universal Serial Bus (USB) peripheral device which enables any peripheral device in a particular model line to be interchanged with another device from the same model line, without requiring reinstallation of the device driver or reconfiguration of the communication port by the host device.

In an example embodiment of the invention, a USB peripheral device belonging to a model line of identical peripheral devices is provided. The peripheral device includes a USB interface enabling connection of the peripheral device to a USB port of a host device. The peripheral device also includes a memory for storing a USB device identifier. The USB device identifier comprises a standard device identifier that is the same for all the peripheral devices of the model line.

The USB peripheral device may be any type of peripheral device that requires a USB connection, such as a printer, a modem, a wireless interface, or the like. The host device may be any type of device that is USB equipped and accepts USB peripheral devices, such as a personal computer, an Internet appliance, or the like.

The USB port may comprise a virtual communication port. In an example embodiment of the invention, the peripheral device may comprise a printer. In such an example embodiment, the USB port may comprise a virtual printer port. In addition, the USB port may comprise a printer name associated with the printer.

The standard USB device identifier identifies each peripheral device in the model line to the host device as identical devices, thereby preventing device driver reinstallation and communication port reassignment when swapping one peripheral device for a another peripheral device from the same model line. This enables identical peripheral devices to be "hot-swappable" such that they can be interchanged on the host device, even when the host device is powered up and running.

In a further example embodiment of the invention, the standard USB device identifier may be configurable. For example, the standard USB device identifier for the peripheral device may be configurable to allow two peripheral devices from the same model line to be connected to the host device simultaneously. The standard USB device identifier may also be configurable to control the communications port of the host device that the peripheral device is associated with. This prevents two identical peripheral devices from being assigned to the same communications port.

The standard USB device identifier may be configured using a configuration tool, such as a software application running on the host device. The host device may be, for example, a personal computer. This tool may be used to change many of the customizable options in the USB peripheral device, one of which may be the standard USB device identifier. Those skilled in the art will appreciate that a custom device could be attached directly to the USB peripheral device to configure the USB device identifier. In an example embodiment where the peripheral device is a printer, the USB device identifier may be configured via the printer key pad.

The standard USB device identifier may comprise a model designation for the model line.

The present invention also includes corresponding methods for enabling USB peripheral devices from a model line of peripheral devices to be interchanged at a USB port of a host device without reinstallation of a new device driver or reassignment of a new communication port. In an example embodiment of the invention, each USB peripheral device from a model line is provided with an identical standard USB device identifier.

The method of the present invention may further comprise enabling configuration of the standard USB device identifier. For example, the standard USB device identifier for the peripheral device may be configurable to allow two peripheral devices from the same model line to be connected to the host device simultaneously. The standard USB device identifier may be configurable to control the communications port of the host device that the peripheral device is associated with. This prevents two identical peripheral devices from being assigned to the same communications port.

The present invention also encompasses a standard USB device identifier for a model line of USB peripheral devices. The standard USB device identifier comprises a string of text data for identifying each peripheral device of the model line of peripheral devices when connected to a USB port of a host device. The string of text data is identical for each peripheral device in the model line.

BRIEF DESCRIPTION OF THE DRAWINGS

The present invention will hereinafter be described in conjunction with the appended drawing figures, wherein like reference numerals denote like elements, and.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

The present invention eliminates the need for re-installation of USB device drivers and the creation and reassignment of a communications port when removing one USB peripheral device from a host device and attaching an identical USB peripheral device. A standard USB identifier is provided that is the same among a USB device model line. (e.g., "POSJet 1000"). This standard USB identifier will make all USB peripheral devices of the same model line appear identical to the host device. This eliminates the need for device driver re-installation and communication port re-assignment.

Figure 1:
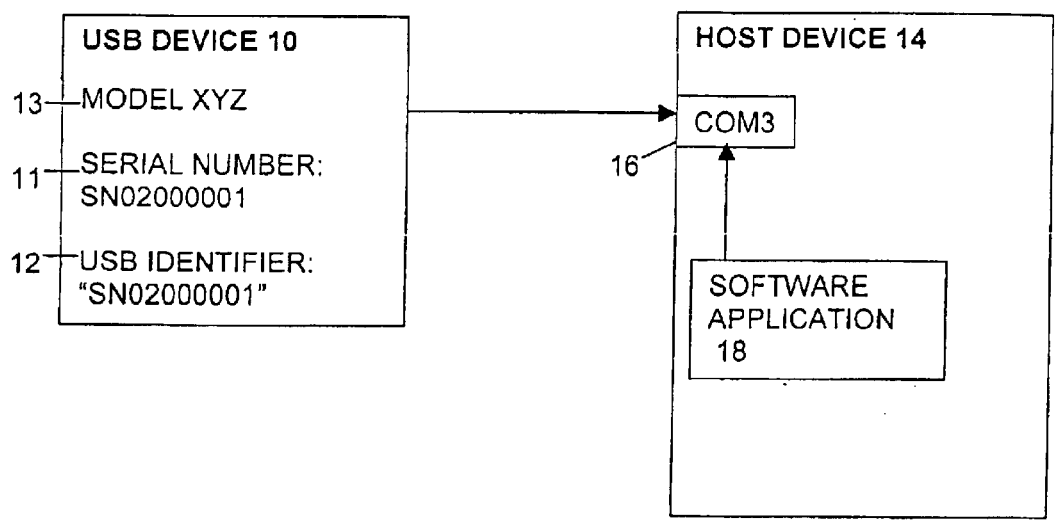
FIG. 1 shows a prior art example connection of a USB peripheral device to a host device.
Figure 2:
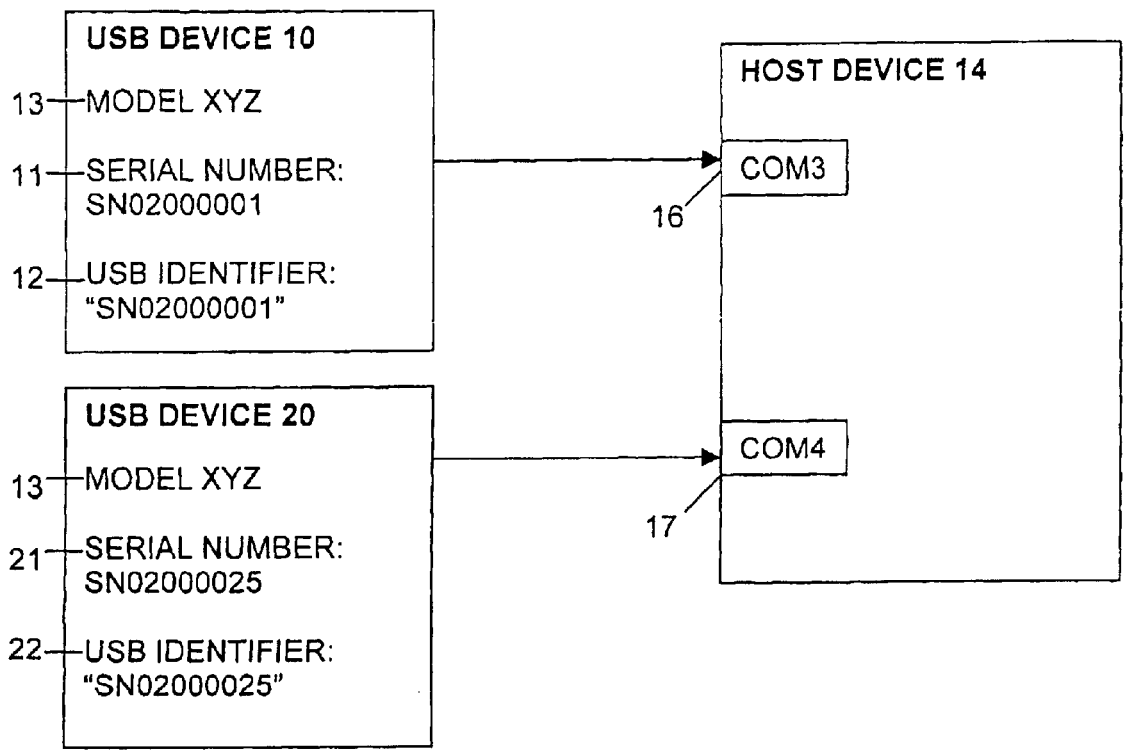
FIG. 2 shows a prior art example connection of multiple USB peripheral devices to a host device.
Figure 3:
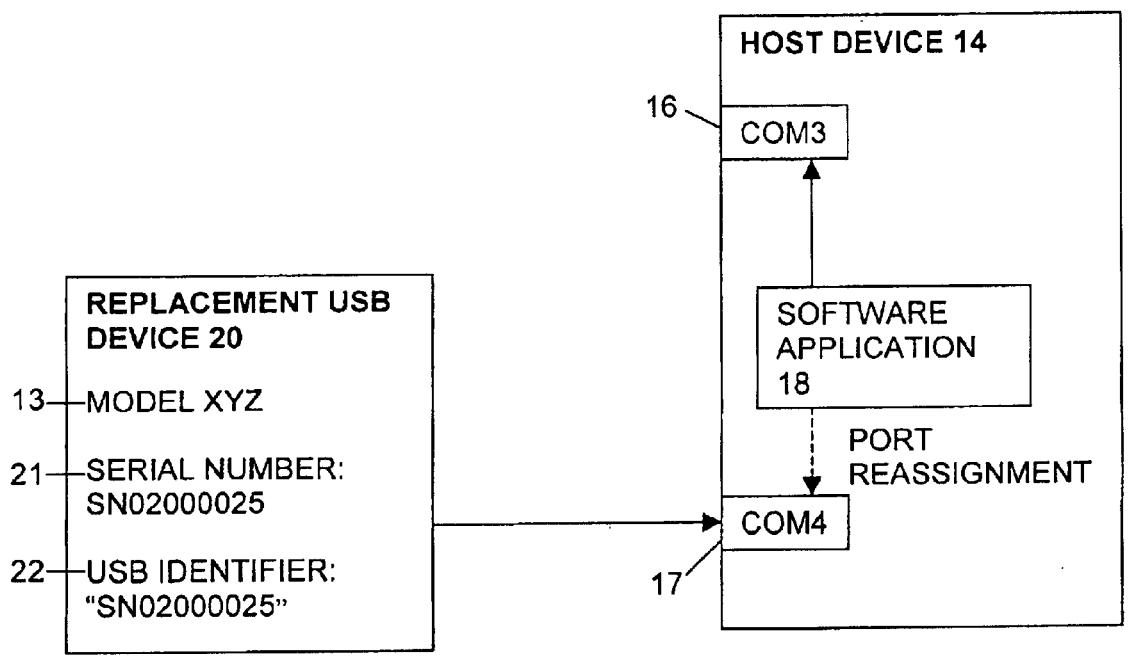
FIG. 3 shows a prior art example connection of a replacement USB peripheral device to a host device.
Figure 4:
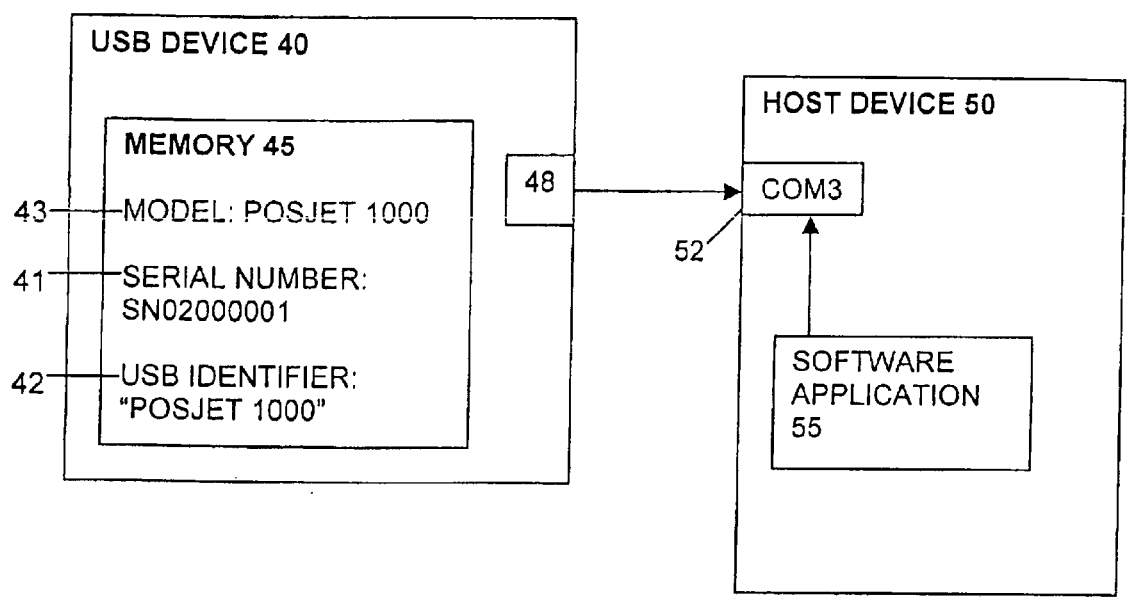
FIG. 4 shows an example embodiment of the present invention.

In an example embodiment of the invention as shown in FIG. 4, a USB peripheral device 40 belonging to a model line of identical peripheral devices is provided. The peripheral device 40 includes a USB interface 48 enabling connection of the peripheral device 40 to a USB port 52 of a host device 50 (COM 3). The peripheral device 40 also includes a memory 45 for storing a USB device identifier 42. The USB device identifier 42 comprises a standard device identifier that is the same for all the peripheral devices of the model line.

The peripheral device 40 may have a model number 43 and a serial number 41, which may be stored in memory 45. The model number 41 designates the model line of the peripheral device 40. In the example embodiment shown in FIG. 4, the USB device identifier 42 is the same as the model number 43. The model number 43 is used as the USB identifier 42 for ease of implementation, since it will be the same for all peripheral devices across that model line. However, those skilled in the art will appreciate that the standard USB device identifier 42 of the present invention may comprise any type of identifier, as long as it is the same for each device in the model line.

The USB peripheral device 40 may be any type of peripheral device that requires a USB connection, such as a printer, a modem, a wireless interface, or the like. The host device 50 may be any type of device that is USB equipped and accepts USB peripheral devices, such as a personal computer, an Internet appliance, or the like.

The USB port 52 may comprise a virtual communication port. In an example embodiment of the invention, the peripheral device 40 may comprise a printer. In such an example embodiment, the USB port 52 may comprise a virtual printer port. In addition, the USB port 52 may comprise a printer name associated with the printer.

The standard USB device identifier 42 identifies each peripheral device 40 in the model line to the host device as identical devices, thereby preventing device driver reinstallation and communication port reassignment when swapping one peripheral device for a another peripheral device from the same model line. This enables identical peripheral devices to be "hot-swappable" such that they can be interchanged on the host device 50, even when the host device is powered up and running.

Figure 5:
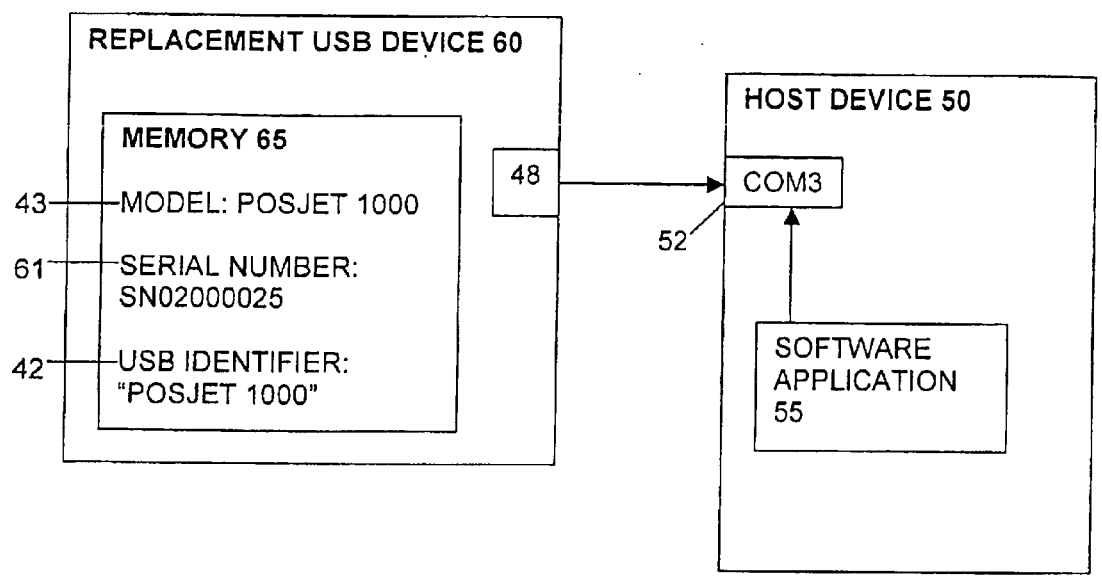
FIG. 5 shows a connection of a replacement USB peripheral device to a host device in accordance with an example embodiment of the invention.

FIG. 5 shows a replacement USB peripheral device 60 which has been connected to host device 50 in place of USB peripheral device 40 (shown in FIG. 4). The replacement USB device 60 has a USB device identifier 42 stored in memory 65, which USB identifier 42 is identical to that of USB peripheral device 40 (e.g., "POSJET 1000"). Replacement USB device 60 has the same model number 43 as USB peripheral device 40, but a unique serial number 61. But since the USB device identifier 42 remains the same, the host device 50 functions as if no change has taken place when USB peripheral device 60 is substituted for USB peripheral device 40. Since host device 50 receives the same USB device identifier 42 from the replacement USB peripheral device 60 that it previously received from USB peripheral device 40, and since the USB peripheral device 60 is the same model as USB peripheral device 40, no reinstallation of the device driver for the peripheral device 60 is needed. Further, the communication port need not be reassigned. The application 55 which previously communicated with USB peripheral device 40 via communication port 52 is able to communicate with USB peripheral device 60 via this same communication port 52, obviating the need to reassign the communication port used by the application 55.

In a further example embodiment of the invention, the standard USB device identifier 42 may be configurable. This configurability allows the end user or system integrator to modify the standard USB device identifier 42. If there is no ability to configure the standard USB device identifier 42, a problem arises when two or more peripheral devices of the same model line are attached to the same host device 50. The host device operating system will not be able to uniquely identify the second USB device, since the USB device identifiers are the same. This will result in the second peripheral device being non-functional (i.e. the host device will not be able to communicate with the second peripheral device.) The configurability of the USB identifier will allow a solution to this problem.

Figure 6:
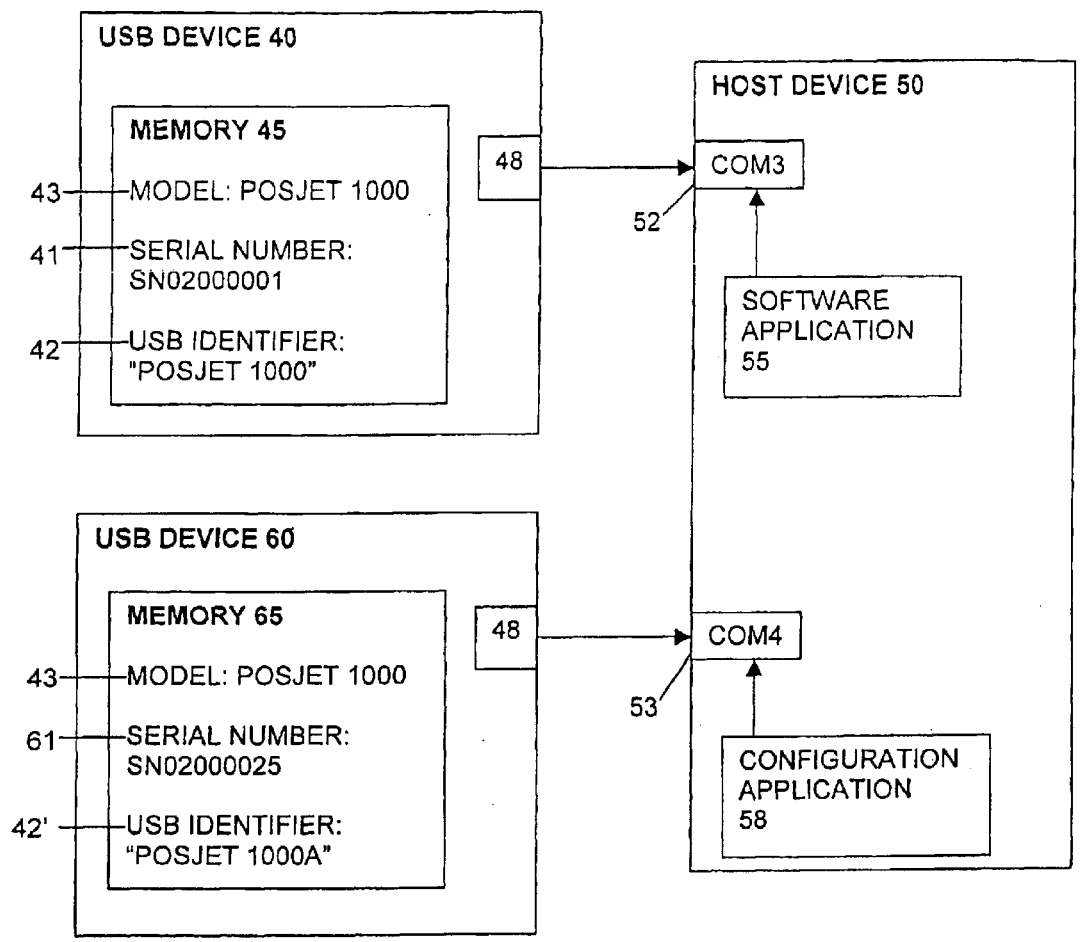
FIG. 6 shows connection of multiple USB peripheral devices to a host device in accordance with an example embodiment of the invention.

FIG. 6 shows two USB peripheral devices 40, 60 of the same model line connected to the host device in accordance with the present invention. The second USB peripheral device 60 is given a different USB identifier 42', via the ability to configure the USB identifier 42, (e.g., changing "POSJET 1000" to "POSJET 1000A"). This reconfiguration of the USB device identifier 42' of USB peripheral device 60 allows both peripheral devices 40, 60 from the same model line to be connected to the host device simultaneously. Further, the ability to configure the USB device identifier enables the operating system of the host device 50 to distinguish between and among multiple USB peripheral devices of the same model line (e.g., "POSJET 1000" vs. "POSJET 1000A" or "POSJET 1000" vs. "POSJET 1000A" vs. "POSJET 1000B vs . . . ").

The standard USB device identifier may also be configurable to control the communications port of the host device that the peripheral device is associated with. This prevents two identical peripheral devices from being assigned to the same communications port.

The standard USB device identifier 42 may be configured using a configuration tool, such as a software application 58 running on the host device 50. The host device 50 may be, for example, a personal computer. This tool may be used to change many of the customizable options in the printer, one of which may be the standard USB device identifier. Those skilled in the art will appreciate that a separate custom device could be attached directly to the USB peripheral device 60 to configure the USB device identifier. In an example embodiment where the peripheral device is a printer, the USB device identifier may be configured via the printer key pad.

The present invention also includes corresponding methods for enabling USB peripheral devices from a model line of peripheral devices to be interchanged at a USB port of a host device without reinstallation of a new device driver or reassignment of a new communication port. In an example embodiment of the invention, each USB peripheral device 40 from a model line is provided with an identical standard USB device identifier 42.

The method of the present invention may further comprise enabling configuration of the standard USB device identifier 42. For example, the standard USB device identifier 42' for the peripheral device 60 may be configurable to allow two peripheral devices from the same model line to be connected to the host device simultaneously, as shown in FIG. 6. The standard USB device identifier may be configurable to control the communications port of the host device 50 that the peripheral device 60 is associated with. This prevents two identical peripheral devices from being assigned to the same communications port.

The present invention also encompasses a standard USB device identifier 42 for a model line of USB peripheral devices 40. The standard USB device identifier 42 comprises a string of text data for identifying each peripheral device 40 of the model line of peripheral devices when connected to a USB port 52 of a host device 50. The string of text data 42 is identical for each peripheral device 40 in the model line.

It should now be appreciated that the present invention provides advantageous methods and apparatus for enabling interchangeability of identical USB peripheral devices without the need to reinstall device drivers or reconfigure communication ports on the host device.

Although the invention has been described in connection with various illustrated embodiments, numerous modifications and adaptations may be made thereto without departing from the spirit and scope of the invention as set forth in the claims.

What is claimed is:

1. A USB peripheral device belonging to a model line of identical peripheral devices, said peripheral device comprising:
   a USB interface enabling connection of the peripheral device to a USB port of a host device; and
   memory for storing a USB device identifier used by said host device to select a USB device driver to load when said peripheral device is initially connected to said USB port, said USB device identifier comprising a device identifier which is identical for all the peripheral devices of the model line.

2. A peripheral device in accordance with claim 1, wherein:
   said USB port comprises a virtual communication port.

3. A peripheral device in accordance with claim 1, wherein:
   said peripheral device comprises a printer.

4. A peripheral device in accordance with claim 3, wherein:
   said USB port comprises a virtual printer port.

5. A peripheral device in accordance with claim 3, wherein:
   said USB port comprises a printer name associated with said printer.

6. A peripheral device in accordance with claim 1, wherein:
   said USB device identifier identifies each peripheral device in the model line to the host device as identical devices, thereby preventing device driver reinstallation and communication port reassignment when swapping said peripheral device for a another peripheral device from said model line.

7. A peripheral device in accordance with claim 1, wherein:
   said USB device identifier is configurable.

8. A peripheral device in accordance with claim 7, wherein:
   said USB device identifier for said peripheral device is configurable to allow two peripheral devices from the model line to be connected to said host device simultaneously.

9. A peripheral device in accordance with claim 7, wherein:
   said USB device identifier is configurable to control the communications port of the host device that said peripheral device is associated with.

10. A peripheral device in accordance with claim 7, wherein said configuration of said USB device identifier is enabled by a configuration tool.

11. A peripheral device in accordance with claim 10, wherein said configuration tool comprises a software application running on the host device.

12. A peripheral device in accordance with claim 10, wherein said configuration tool comprises a separate device capable of communicating with said peripheral device.

13. A peripheral device in accordance with claim 7, wherein:
said peripheral device comprises a printer; and
said USB device identifier is configured via a printer key pad.

14. A peripheral device in accordance with claim 1, wherein:
said USB device identifier comprises a model designation for said model line.

15. A method for enabling USB peripheral devices from a model line of peripheral devices to be interchanged at a USB port of a host device without reinstallation of a new device driver or reassignment of a new communication port, comprising:
providing each USB peripheral device from said model line with an identical USB device identifier for use by said host device to select a USB device driver to load when a peripheral device is initially connected to said USB port.

16. A method in accordance with claim 15, wherein:
said USB port comprises a virtual communication port.

17. A method in accordance with claim 15, wherein:
said peripheral device comprises a printer.

18. A method in accordance with claim 17, wherein:
said USB port comprises a virtual printer port.

19. A method in accordance with claim 17, wherein:
said USB port comprises a printer name associated with said printer.

20. A method in accordance with claim 15, wherein:
said USB device identifier identifies each peripheral device in the model line to a host device as identical devices.

21. A method in accordance with claim 15, further comprising:
enabling configuration of the USB device identifier.

22. A method in accordance with claim 21, wherein:
said USB device identifier for said peripheral device is configurable to allow two peripheral devices from the model line to be connected to said host device simultaneously.

23. A method in accordance with claim 21, wherein:
said USB device identifier is configurable to control the communications port of the host device that said peripheral device is associated with.

24. A method in accordance with claim 21, wherein said configuration of said USB device identifier is enabled by a configuration tool.

25. A method in accordance with claim 24, wherein said configuration tool comprises a software application running on the host device.

26. A method in accordance with claim 24, wherein said configuration tool comprises a separate device capable of communicating with said peripheral device.

27. A method in accordance with claim 21, wherein:
said peripheral device comprises a printer; and
said USB device identifier is configured via a printer key pad.

28. A method in accordance with claim 15, wherein:
said USB device identifier comprises a model designation for said model line.

29. A method for providing a standard USB device identifier for a model line of USB peripheral devices, comprising:
providing a string of text data for use as a USB device identifier for identifying each peripheral device of said model line of peripheral devices when connected to a USB port of a host device, such that the host device can select an appropriate USB device driver to load when a peripheral device is initially connected to said USB port, said string of text data being identical for each peripheral device in said model line; and
storing said identical string of text data in memory of each of said peripheral devices of said model line.

30. A method in accordance with claim 29, wherein:
said USB port comprises a virtual communication port.

31. A method in accordance with claim 29, wherein:
said peripheral device comprises a printer.

32. A method in accordance with claim 31, wherein:
said USB port comprises a virtual printer port.

33. A method in accordance with claim 31, wherein:
said USB port comprises a printer name associated with said printer.

34. A method in accordance with claim 29, wherein:
said USB device identifier identifies each peripheral device in the model line to the host device as identical devices.

35. A method in accordance with claim 29, wherein:
said USB device identifier is configurable.

36. A method in accordance with claim 35, wherein:
said USB device identifier is configurable to allow two peripheral devices from the model line to be connected to said host device simultaneously.

37. A method in accordance with claim 35, wherein:
said USB device identifier is configurable to control the communications port of the host device that said peripheral device is associated with.

38. A method in a accordance with claim 35, wherein said configuration of said USB device identifier is enabled by a configuration tool.

39. A method in accordance with claim 38, wherein said configuration tool comprises a software application running on the host device.

40. A method in accordance with claim 38, wherein said configuration tool comprises a separate device capable of communicating with said peripheral device.

41. A method in accordance with claim 35, wherein:
said peripheral device comprises a printer; and
said USB device identifier is configured via a printer key pad.

42. A method in accordance with claim 29, wherein:
said USB device identifier comprises a model designation for said model line.

* * * * *